(12) United States Patent
Kikuchi et al.

(10) Patent No.: US 11,970,637 B2
(45) Date of Patent: Apr. 30, 2024

(54) BLOCK POLYMER, POLYMER COMPOSITION, AND ADHESIVE

(71) Applicant: ENEOS MATERIALS CORPORATION, Tokyo (JP)

(72) Inventors: Toshimitsu Kikuchi, Tokyo (JP); Hirofumi Senga, Tokyo (JP); Tatsumoto Nakahama, Tokyo (JP); Takuya Sano, Tokyo (JP); Takato Fukumoto, Tokyo (JP); Yuto Sakagami, Tokyo (JP); Toshiyuki Hayakawa, Tokyo (JP)

(73) Assignee: ENEOS MATERIALS CORPORATION, Tokyo (JP)

( * ) Notice: Subject to any disclaimer, the term of this patent is extended or adjusted under 35 U.S.C. 154(b) by 84 days.

(21) Appl. No.: 17/688,944

(22) Filed: Mar. 8, 2022

(65) Prior Publication Data
US 2022/0290017 A1 Sep. 15, 2022

(30) Foreign Application Priority Data
Mar. 12, 2021 (JP) .................................. 2021-040679

(51) Int. Cl.
C09J 153/02 (2006.01)
C08L 53/02 (2006.01)
C09J 7/30 (2018.01)

(52) U.S. Cl.
CPC .......... C09J 153/025 (2013.01); C08L 53/025 (2013.01); C09J 7/30 (2018.01); C09J 2453/00 (2013.01)

(58) Field of Classification Search
CPC . C09J 153/025; C09J 2453/00; C08L 53/025; C08F 297/044
See application file for complete search history.

(56) References Cited

U.S. PATENT DOCUMENTS

| 6,291,583 | B1 | 9/2001 | Komatsuzaki et al. |
| 6,534,593 | B1 | 3/2003 | Komatsuzaki et al. |
| 2016/0333235 | A1 | 11/2016 | Nakatani et al. |

FOREIGN PATENT DOCUMENTS

| JP | H08104792 | * | 4/1996 |
| JP | 2014-129479 A | | 7/2014 |

OTHER PUBLICATIONS

Electronic tranlation of Tomohiko et al. (JP H08104792), Apr. 23, 1996.*
Extended European Search Report dated Aug. 12, 2022 in English Patent Application No. 22161559.4, 7 pages.

* cited by examiner

*Primary Examiner* — Jeffrey C Mullis
(74) *Attorney, Agent, or Firm* — Oblon, McClelland, Maier & Neustadt, L.L.P.

(57) ABSTRACT

Provided is a block polymer including two or more polymer block As each having a value β of 0.20 or less and a functional group F containing at least one element selected from a group consisting of nitrogen, silicon, oxygen, and sulfur in a part or all of terminals of the two or more polymer block As, in which the block polymer has a value α of 0.75 or more, when p, q, r and s are defined as a component proportion (molar proportion) of a structural unit represented by Formula (1), a component proportion of a structural unit represented by Formula (2), a component proportion of a structural unit represented by Formula (3), and a component proportion of a structural unit represented by Formula (4), in the polymer, respectively.

$$\alpha = (p + (0.5 * r))/(p + q + (0.5 * r) + s) \quad \text{(i)}$$

$$\beta = (p + q)/(p + q + (0.5 * r) + s) \quad \text{(ii)}$$

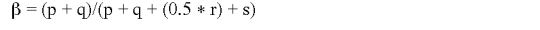

(1)

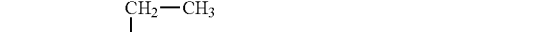

(2)

—CH$_2$—CH$_2$—  (3)

—CH$_2$—CH=CH—CH$_2$—  (4)

20 Claims, No Drawings

BLOCK POLYMER, POLYMER COMPOSITION, AND ADHESIVE

CROSS-REFERENCE TO RELATED APPLICATION

This application claims the benefit of foreign priority to Japanese Patent Application No. JP 2021-040679, filed Mar. 12, 2021, which is incorporated by reference in its entirety.

TECHNICAL FIELD

The present invention relates to a block polymer, a polymer composition, and an adhesive.

BACKGROUND ART

In the related art, for protecting surfaces of various members such as an optical member, a metal plate, and a synthetic resin plate from contamination and damage, the surfaces of the members are often coated with a surface protective film (see, for example, Patent Literature 1). Patent Literature 1 discloses that an adhesive layer of the surface protective film is formed using a block copolymer and a hydrogenated product of the block copolymer, the block copolymer having a polymer block having the content of an aromatic alkenyl compound unit of 80 mass % or more, a polymer block having a conjugated diene unit and an aromatic alkenyl compound unit at random, and a polymer block having the content of a conjugated diene unit content of more than 80 mass %.

CITATION LIST

Patent Literature

Patent Literature 1: JP-A-2014-129479

SUMMARY OF INVENTION

Technical Problem

An adhesive layer for a surface protective film and the like is required to have adhesive properties such as initial adhesiveness to an adherend, a property of holding adhesive strength after attachment (low increase in adhesiveness), oil resistance, and resistance to generation of an adhesive residue. However, it is difficult to develop a material that exhibits all of the adhesive properties in a balanced manner, and further improvement is required for the adhesive.

The present invention has been made in view of the above problems. A main object of the present invention is to provide a block polymer capable of providing an adhesive being excellent in initial adhesiveness, low increase in adhesiveness, expandability, and oil resistance, and hardly leaving an adhesive residue on an adherend.

The present invention provides the following block polymers, polymer compositions, and adhesives.

[1] A block polymer includes: two or more polymer block As each having a value 3 of 0.20 or less represented by the following equation (ii) and a functional group F containing at least one element selected from a group consisting of nitrogen, silicon, oxygen, and sulfur in a part or all of terminals of the two or more polymer block As, the block polymer having a value α of 0.75 or more represented by the following equation (i), when p is defined as a component proportion (molar proportion) of a structural unit represented by the following formula (1), q is defined as a component proportion (molar proportion) of a structural unit represented by the following formula (2), r is defined as a component proportion (molar proportion) of a structural unit represented by the following formula (3), and s is defined as a component proportion (molar proportion) of a structural unit represented by the following formula (4), in the polymer.

[2] A polymer mixture includes: the block polymer of the above [1]; and a block polymer having one polymer block A and having the value α of 0.75 or more.

[3] An adhesive, which is obtained using the block polymer of the above [1] or the polymer mixture of the above [2].

Advantageous Effects of Invention

The block polymer in the present invention allows to provide an adhesive that is excellent in initial adhesiveness, low increase in adhesiveness, expandability, and oil resistance, and hardly leaves an adhesive residue on an adherend (particularly, a polar adherend).

DESCRIPTION OF EMBODIMENTS

The following will describe the items relating to the implementation of the present invention in detail. In the present specification, a numerical range described using "to" represents a range including numerical values described before and after "to" as a lower limit value and an upper limit value.

<<Block Polymer>>

A block polymer according to the present disclosure (hereinafter, also referred to as the "present polymer") is a polymer including a polymer block A and a polymer block different from the polymer block A (hereinafter, also referred to as a "polymer block B"). In the present polymer, when p is defined as a component proportion (molar proportion) of a structural unit represented by the following formula (1), q is defined as a component proportion (molar proportion) of a structural unit represented by the following formula (2), r is defined as a component proportion (molar proportion) of a structural unit represented by the following formula (3), and s is defined as a component proportion (molar proportion) of a structural unit represented by the following formula (4), in the polymer, a value α represented by the following equation (i) is 0.75 or more. The polymer block A is a segment in which a value β represented by the following equation (ii) is 0.20 or less.

$$\alpha = (p + (0.5 \times r))/(p + q + (0.5 \times r) + s) \quad \text{(i)}$$

$$\beta = (p + q)/(p + q + (0.5 \times r) + s) \quad \text{(ii)}$$

[Chem. 2]

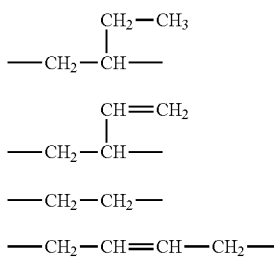

(1) —CH$_2$—CH(CH$_2$—CH$_3$)—

(2) —CH$_2$—CH(CH=CH$_2$)—

(3) —CH$_2$—CH$_2$—

(4) —CH$_2$—CH=CH—CH$_2$—

<Polymer Block A>

The polymer block A is a segment containing a structural unit derived from 1,3-butadiene. A monomer constituting the polymer block A may be 1,3-butadiene alone, or may further contain a compound different from 1,3-butadiene (hereinafter, also referred to as "another monomer"). Examples of another monomer include a conjugated diene compound different from 1,3-butadiene, and an aromatic vinyl compound.

Specific examples of another monomers include, as the conjugated diene compound, isoprene, 2,3-dimethyl-1,3-butadiene, 1,3-pentadiene, 2-methyl-1,3-pentadiene, 1,3-hexadiene, 4,5-diethyl-1,3-octadiene, β-farnesene, and chloroprene. Among these, at least one selected from a group consisting of isoprene, 1,3-pentadiene, and 2,3-dimethyl-1, 3-butadiene is preferable, and isoprene is more preferable, as the compound(s) can be industrially used and can provide a polymer exhibiting excellent physical properties. When the conjugated diene compound is used as another monomer, the conjugated diene compound may be used alone or in combination of two or more thereof.

Examples of the aromatic vinyl compound include styrene, tert-butylstyrene, α-methylstyrene, p-methylstyrene, p-ethylstyrene, divinylbenzene, 1,1-diphenylstyrene, vinylnaphthalene, vinylanthracene, N,N-diethyl-p-aminoethylstyrene, and vinylpyridine. Among these, styrene is particularly preferable. As the aromatic vinyl compound, one of the compounds may be used alone, or two or more of the compounds may be used in combination.

The polymer block A is a segment mainly containing a structural unit derived from 1,3-butadiene (hereinafter, also referred to as a "butadiene unit"). Specifically, a ratio of the butadiene unit in the polymer block A is preferably 75 mass % or more, more preferably 80 mass % or more, still more preferably 90 mass % or more, and particularly preferably 95 mass % or more, with respect to total structural units derived from the monomers constituting the polymer block A. When the butadiene unit of the polymer block A is in the above range, the increase in adhesiveness of the present polymer can be suppressed. The polymer block A can be made into a crystalline block segment having a structure similar to that of low-density polyethylene (LDPE) by hydrogenation. In this case, the use of the present polymer for the adhesive applications allows for suppressing the increase in adhesiveness, improving the expandability of the adhesive, and further improving the oil resistance. Thus, the case is preferable.

A preferred embodiment of the polymer block A is a segment obtained by polymerizing a monomer containing 1,3-butadiene and then performing hydrogenation. A vinyl bond content of the polymer block A is 20 mol % or less. More than 20 mol % of the vinyl bond content of the polymer block A causes the present polymer to be too soft, and this tends to cause a decrease in mechanical properties, a decrease in processability, and a decrease in adhesive performance (in particular, increase in adhesiveness). From the above viewpoint, the vinyl bond content of the polymer block A is preferably 18 mol % or less, and more preferably 16 mol % or less. The vinyl bond content of the polymer block A is, for example, 5 mol % or more.

In the present specification, the "vinyl bond content" is a value indicating a ratio of a structural unit having a 1,2-bond to all structural units derived from 1,3-butadiene contained in the polymer before hydrogenation, and is a value measured by a $^1$H-NMR device. The vinyl bond content of the polymer is represented by p in the above equation (ii). For example, when β is 0.20, the vinyl bond content of the polymer (or polymer block) is 20 mol %.

A part or all of terminals of the two or more polymer block As included in the present polymer have a functional group F containing at least one element selected from a group consisting of nitrogen, silicon, oxygen, and sulfur. This allows for providing a block polymer having excellent adhesive performance.

Specific examples of the functional group F include a primary amino group, a secondary amino group, a tertiary amino group, a nitrogen-containing group in which two hydrogen atoms of a primary amino group are substituted with two protective groups, a nitrogen-containing group in which one hydrogen atom of a secondary amino group is substituted with one protective group, an imino group, a nitrogen-containing heterocyclic group (for example, a group having a heterocyclic ring such as a pyridine ring or an imide ring), a hydroxyl group, an oxygen-containing group in which one hydrogen atom of a hydroxyl group is substituted with one protective group, a thiol group, a sulfur-containing group in which one hydrogen atom of a thiol group is substituted with one protective group, and a hydrocarbyloxysilyl group. The functional group F is preferably a nitrogen-containing functional group (nitrogen-containing group), and the nitrogen-containing functional group particularly preferably has at least one selected from the group consisting of a primary amino group, a secondary amino group, a tertiary amino group, and an imide group, from the viewpoint that the group has a high effect of improving adhesiveness to an adherend having high polarity, and from the viewpoint that the group allows for suppressing an excessive adhesion to an adherend having low polarity and has a high effect of improving expandability. From the viewpoint of keeping a reaction site with a modifying agent (post-modifying agent) or a crosslinking agent that can be used in a subsequent reaction and capable of improving heat resistance, solvent resistance, suppression of adhesive residue, and contamination of the adherend by residues, the present polymer preferably has at least one of a primary amino group and a secondary amino group at a part or all of the terminals of the polymer block A, and particularly preferably has two or more groups of at least one of the primary amino group and the secondary amino group in one molecule.

An end of the polymer block A on a side of the end having the functional group F preferably constitutes the end of the present polymer. That is, the polymer block A is disposed at an end of the present polymer, and the present polymer preferably has a functional group F at the terminal of the polymer. Introducing the functional group F into a part or all of the terminals of the block polymer allows for improving the adhesive performance.

<Polymer Block B>

The polymer block B is preferably a segment containing a structural unit derived from a conjugated diene compound. Examples of the conjugated diene compound constituting the polymer block B include the same compounds as the conjugated diene compounds (including 1,3-butadiene) exemplified in the description of the polymer block A. Among these, at least one selected from the group consisting of 1,3-butadiene, isoprene, 1,3-pentadiene, 2,3-dimethyl-1,3-butadiene, and β-farnesene is preferable, at least one selected from the group consisting of 1,3-butadiene and isoprene is more preferable, and 1,3-butadiene is particularly preferable, because these compounds are industrially usable and capable of providing a polymer having excellent physical properties. As the conjugated diene compound, one of the compounds may be used alone, or two or more of the compounds may be used in combination.

The vinyl bond content of the polymer block B (that is, the value β represented by equation (ii)) is preferably larger than that of the polymer block A. Specifically, the vinyl bond content of the polymer block B is preferably 25 mol % or more, more preferably 30 mol % or more, still more preferably 45 mol % or more, and particularly preferably 50 mol % or more. When the vinyl bond content of the polymer block B is within the above range, the adhesive performance (in particular, peel strength and tackiness) of the present polymer can be sufficiently increased, solution viscosity when the polymer is dissolved in an organic solvent can be reduced, and productivity and processability can be increased. Thus, the vinyl bond content within the above range is preferable. The vinyl bond content of the polymer block B is, for example, 90 mol % or less.

The polymer block B may be a segment formed only of the conjugated diene compound, or may further include a structural unit derived from a monomer copolymerizable with the conjugated diene compound, together with a structural unit derived from the conjugated diene compound (hereinafter, also referred to as a "conjugated diene unit").

In the polymer block B, the monomer to be copolymerized with the conjugated diene compound is not limited. Among these, the aromatic vinyl compound is preferable. When the polymer block B has a structural unit derived from the aromatic vinyl compound (hereinafter, also referred to as an "aromatic vinyl unit"), when the present polymer is used for adhesive applications, the expandability of the adhesive can be improved, and vibration damping characteristics can be improved. Thus, the polymer block B having a structural unit derived from the aromatic vinyl compound is preferable. Examples of the monomer that provides the aromatic vinyl unit in the polymer block B include the same compounds as the aromatic vinyl compounds exemplified in the description of the polymer block A. Among these, styrene is particularly preferable.

In the polymer block B, the ratio of the conjugated diene unit is preferably 30 mass % or more, more preferably 50 mass % or more, and still more preferably 65 mass % or more, with respect to the total structural units derived from the monomers constituting the polymer block B. When the ratio of the conjugated diene unit contained in the polymer block B is within the above range, the adhesive strength of the present polymer can be enhanced, and the adhesive in which the adhesive residue is less likely to occur can be obtained. Thus, the conjugated diene unit contained in the polymer block B within the above range is preferable.

When the polymer block B contains the aromatic vinyl unit, the ratio of the aromatic vinyl unit in the polymer block B is preferably 70 mass % or less, more preferably 60 mass % or less, and still more preferably 50 mass % or less, with respect to the total structural units derived from the monomers constituting the polymer block B. When the ratio of the aromatic vinyl unit in the polymer block B is within the above range, the vibration damping characteristics of a mixture containing the present polymer can be improved, and the expandability of the adhesive can be further improved when the mixture is applied to the adhesive. Thus, the ratio of the aromatic vinyl unit in the polymer block B within the above range is preferable.

When the polymer block B is a copolymer of the conjugated diene compound and another monomer (preferably the aromatic vinyl compound), a distribution of another monomer in the polymer block B is not limited, and may be, for example, a random form, a tapered form, a partial block form, or any combination thereof. Among these, a random form is preferable as an effect of the introduction of another monomer can be sufficiently obtained by introducing another monomer into the entire polymer block B.

<Block Configuration>

The number of blocks, an arrangement of the blocks, a polymer structure, and the like of the present polymer are not limited as long as the polymer has two or more polymer block As and two or more kinds of polymer blocks including the polymer block A. The present polymer may be a linear or non-linear polymer having two or more polymer block As and one or more polymer block Bs. Among these, the non-linear polymer is preferable, and a radial polymer (also referred to as a star polymer) is more preferable as such a polymer can achieve the block polymer having excellent adhesive performance, can form a network structure more efficiently in a reaction with a crosslinking agent capable of reacting with the functional group F to improve the heat resistance, the solvent resistance, the suppression of adhesive residue and the contamination resistance due to a low residue. In particular, the present polymer preferably has a structure in which two or more polymer chains having the polymer block A bond to a partial structure E derived from a coupling agent.

Preferred specific examples of the present polymer include a block polymer having a structure represented by the following formula (5).

(In formula (5), $P^1$ is a polymer chain having the polymer block A. $X^1$ is a partial structure derived from the coupling agent (hereinafter, also referred to as "partial structure E". n is an integer of 2 or more).

In the formula (5), $P^1$ is preferably linear. Examples of $P^1$ include an AB-type diblock body formed of polymer block A/polymer block B, an ABA-type triblock body formed of polymer block A/polymer block B/polymer block A, and a BAB-type triblock body formed of polymer block B/polymer block A/polymer block B. $P^1$ may further include a polymer block different from the polymer block A and the polymer block B, and may be a polymer chain having four or more blocks. Among these, $P^1$ is preferably the AB-type diblock body, as such a $P^1$ allows for providing a polymer exhibiting excellent adhesive performance with a smaller number of blocks and the productivity is excellent.

n is preferably an integer of 2 to 10 from the viewpoint of ensuring the processability of the present polymer. n is preferably 3 or more, and particularly preferably 4 or more, from the viewpoint that this allows for providing a polymer having further improved adhesive performance (particularly, the peel strength and suppression of increase in adhesiveness). In the formula (5), a polymer in which n is 4 or more, that is, a block polymer having a structure in which four or more polymer chain $P^1$s bond to the partial structure E is particularly preferable as such a block polymer has a high effect of improving the adhesive strength, can form the network structure more efficiently with the crosslinking agent, and can be expected to have the effect of improving the solvent resistance and the heat resistance can be expected.

In the present polymer, the ratio of the polymer block A to the total amount (100 mass %) of the polymer block A and the polymer block B is preferably 10 mass % or more, more preferably 15 mass % or more, and still more preferably 20 mass % or more. The ratio of the polymer block A to the total amount of the polymer block A and the polymer block B is preferably 80 mass % or less, more preferably 60 mass % or less, still more preferably 50 mass % or less, and particularly preferably 40 mass % or less. Setting the ratio of the polymer block A to be 10 mass % or more allows the present polymer not to be too soft, and allows for improving handleability of the present polymer and imparting good solvent resistance to the present polymer. Thus, such a ratio of the polymer block A is preferable. Setting the ratio of the polymer block A to be 80 mass % or less allows for sufficiently keeping the mechanical properties of the present polymer. Thus, such a ratio of the polymer block A is preferable.

In the present polymer, the value $\alpha$ represented by the above equation (i) is 0.75 or more. In the present polymer, when the value $\alpha$ is less than 0.75, the adhesiveness of the present polymer tends to increase, and the oil resistance tends to decrease. From the viewpoint of obtaining a polymer exhibiting good low increase in adhesiveness and oil resistance, the value $\alpha$ in the present polymer is preferably 0.80 or more, more preferably 0.85 or more, still more preferably 0.90 or more, yet still more preferably 0.95 or more, and particularly preferably 0.97 or more. The value $\alpha$ in the present polymer is, for example, 0.99 or less in order to keep the peel strength and the tackiness of the polymer.

In the present specification, the value $\alpha$ represented as the value $\alpha$ in the above equation (i) represents a hydrogenation rate of the polymer. For example, when a is 0.75, the hydrogenation rate of the polymer is 75%. The "hydrogenation rate" is a value measured by the $^1$H-NMR device.

<Production of Block Polymer>

A method for producing the block polymer is not limited. For a polymerization method to be used, any of a solution polymerization method, a gas phase polymerization method, a bulk polymerization method, and the like may be used. The solution polymerization method is particularly preferable. For the polymerization method, either a batch method or a continuous method may be used. When the solution polymerization method is used, examples of a specific polymerization method include a method in which a monomer is polymerized in an organic solvent in the presence of a polymerization initiator and a vinyl content modifier (randomizer) used as necessary to produce a polymer chain $P^1$ having a polymer block A (polymerization step), then a coupling reaction is performed by adding a coupling agent (coupling step), and then a hydrogenation reaction is performed (hydrogenation step).

(Polymerization Step)

As the polymerization initiator, an alkali metal compound is preferably used. Specific examples of the alkali metal compound include alkyllithium such as methyllithium, ethyllithium, n-propyllithium, n-butyllithium, sec-butyllithium, and t-butyllithium; 1,4-disalicylate, phenyllithium, stilbene lithium, naphthyllithium, 1,3-bis(1-lithio-1,3-dimethylpentyl) benzene, 1,3-phenylenebis(3-methyl-1-phenylpentylidene)dilithium, naphthylsodium, naphthylpotassium, and ethoxypotassium. Among these, the alkali metal compound to be used as the polymerization initiator is preferably a lithium compound.

The polymerization reaction is preferably performed in the presence of a compound (R) obtained by mixing the above alkali metal compound and a compound having the functional group F (hereinafter, also referred to as "initiation terminal modifying agent"). By performing polymerization in the presence of the compound (R), the functional group F can be introduced into a polymerization initiation terminal of the polymer chain $P^1$.

The compound (R) is preferably a reaction product of a lithium compound such as alkyllithium and a compound having a nitrogen atom. The initiation terminal modifying agent is preferably a secondary amine compound. Examples the compound (R) include alkylamines, alicyclic amines, aromatic amines, and heterocyclic amines. Specific examples of the initiation terminal modifying agent include dimethylamine, diethylamine, dipropylamine, dibutylamine, dodecamethyleneimine, N,N'-dimethyl-N'-trimethylsilyl-1, 6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, 1,3-ditrimethylsilyl-1,3,5-triazinane. Among these, for a purpose of improving reactivity with a post-modifying agent (maleic anhydride or the like) or a crosslinking agent (polyfunctional epoxy compound or the like), a compound having a group in which at least one of a primary amino group and a secondary amino group is protected with a silyl-based compound or the like can be preferably used.

When the polymerization is performed in the presence of the compound (R), the compound (R) may be prepared by mixing the alkali metal compound and the initiation terminal modifying agent in advance, and the prepared compound (R) may be added to a polymerization system to perform the polymerization. Alternatively, the compound (R) may be prepared by adding the alkali metal compound and the initiation terminal modifying agent to the polymerization system and mixing the alkali metal compound and the initiation terminal modifying agent in the polymerization system, and then the polymerization may be performed. A amount of the polymerization initiator to be used (the total amount of the polymerization initiators, when two or more types of the polymerization initiator are used) is preferably 0.01 to 20 mmol, and more preferably 0.05 to 15 mmol, with respect to 100 g of the monomer to be used for the synthesis of the polymer.

The vinyl content modifier is used for the purpose of, for example, adjusting the vinyl bond content in the polymer. Examples of the vinyl content modifier include dimethoxybenzene, tetrahydrofuran, dimethoxyethane, diethylene glycol dibutyl ether, diethylene glycol dimethyl ether, 2,2-di (tetrahydrofuryl)propane, 2-(2-ethoxyethoxy)-2-methylpropane, triethylamine, pyridine, N-methylmorpholine, and tetramethylethylenediamine. As the vinyl content modifier, one kind may be used alone, or two or more kinds may be used in combination.

The organic solvent to be used in the polymerization may be an organic solvent that is inert to the reaction. For example, an aliphatic hydrocarbon, an alicyclic hydrocarbon or an aromatic hydrocarbon can be used. Among these, a hydrocarbons having 3 to 8 carbon atoms is preferable. Specific examples of the organic solvent include propane, n-butane, isobutane, n-pentane, isopentane, n-hexane, cyclohexane, propene, 1-butene, isobutene, trans-2-butene, cis-2-butene, 1-pentin, 2-pentin, 1-hexene, 2-hexene, benzene, toluene, xylene, ethylbenzene, heptane, cyclopentane, methylcyclopentane, methylcyclohexane, 1-pentene, 2-pentene, and cyclohexene. As the organic solvent, one kind may be used alone or two or more kinds may be used in combination.

When solution polymerization is performed, a monomer concentration in the reaction solvent is preferably 5 to 50 mass %, and more preferably 10 to 30 mass %, from the viewpoint of maintaining a balance between productivity and easiness of polymerization control. A temperature of the polymerization reaction is preferably from −30° C. to 150° C. The polymerization may be performed while controlling the temperature to be constant, or may be performed while raising the temperature without removing heat. The polymerization reaction is preferably performed under pressure sufficient to substantially keep the monomer in a liquid phase. Such pressure can be obtained by a method such as pressurizing the inside of a reactor with a gas inert to the polymerization reaction.

A method for obtaining a block polymer from the reaction product obtained by the polymerization reaction may be any method. When a block polymer having the polymer block A and the polymer block B is produced, from the viewpoint of productivity, first, either one of the polymer block A and the polymer block B (hereinafter, also referred to as a "first segment") is produced by polymerizing a monomer containing the conjugated diene compound in the presence of the polymerization initiator and the initiation terminal modifying agent. Next, the monomer containing the conjugated diene compound is polymerized in the presence of the first segment to produce another segment (hereinafter, also referred to as a "second segment"). Accordingly, a block polymer in which the functional group F is introduced into an initiation terminal of the first segment can be obtained. Boundaries of the polymer blocks may not be clearly distinguished from each other. In the present polymer, a block polymer having excellent adhesive performance can be obtained as the first segment is the polymer block A.

The vinyl bond content of each polymer block can be adjusted by the amount of the vinyl content modifier to be used. More specifically, first, a low vinyl polybutadiene block to be the polymer block A is produced by polymerizing a monomer containing 1,3-butadiene in the presence of the polymerization initiator, the initiation terminal modifying agent, and, if necessary, the vinyl content modifier. Subsequently, the monomer containing the conjugated diene compound and the vinyl content modifier are added to a reaction system, and the polymerization is performed. Accordingly, a block polymer having two or more polymer blocks having different vinyl bond contents can be obtained.

(Coupling Step)

Next, the block polymer obtained by the polymerization step (that is, the polymer chain constituting the present polymer) is allowed to react with a coupling agent. The coupling agent to be used in the production of the present polymer is not limited, and a coupling agent known in the production of the polymer can be appropriately used. The coupling agent is preferably a polyfunctional coupling agent having two or more reaction sites with the polymer chain. The number of reaction sites of the coupling agent is preferably 3 or more, and more preferably 4 or more.

Specific examples of the coupling agent include 1,2-dibromoethane, methyldichlorosilane, dimethyldichlorosilane, trichlorosilane, methyltrichlorosilane, tetrachlorosilane, tetramethoxysilane, divinylbenzene, diethyl adipate, dioctyl adipate, benzene-1,2,4-triisocyanate, tolylene diisocyanate, epoxidized 1,2-polybutadiene, epoxidized linseed oil, tetrachlorogermanium, tetrachlorotin, butyltrichlorotin, butyltrichlorosilane, dimethylchlorosilane, 1,4-chloromethylbenzene, and bis (trichlorosilyl) ethane.

As the coupling agent, a compound having a functional group F containing at least one element selected from the group consisting of nitrogen, silicon, oxygen, and sulfur and having two or more reaction sites with the polymer chain obtained by the polymerization step (hereinafter, also referred to as a "terminal modifying agent") can also be used. Specific examples of the functional group F contained in the terminal modifying agent include the same groups as the specific examples of the functional group F described in the polymerization step.

Specific examples of such a terminal modifying agent include nitrogen-containing alkoxysilane compounds described in JP-A-2014-177519, JP-A-2016-079217, and WO 2017/221943; and glycidyl group-containing polysiloxanes described in WO 2017/090421. Among these, a polyfunctional coupling agent having a functional group containing nitrogen can be preferably used. The use of the nitrogen-containing polyfunctional coupling agent allows for providing a polymer in which high adhesive strength and suppression of increase in adhesiveness are improved in a balanced manner. Thus, the nitrogen-containing polyfunctional coupling agent is preferable.

The reaction between the block polymer obtained by the polymerization step and the coupling agent is preferably performed as a solution reaction. From the viewpoint of sufficiently promoting the coupling reaction, a usage ratio of the coupling agent (the total amount of the coupling agents, when two or more kinds of the coupling agent are used) is preferably 0.01 mol or more, and more preferably 0.05 mol or more, with respect to 1 mol of the metal atom involved in the polymerization of the polymerization initiator. From the viewpoint of avoiding a decrease in processability and excessive addition of the coupling agent, a usage ratio of the coupling agent is preferably less than 2.0 mol, and more preferably less than 1.5 mol, with respect to 1 mol of the metal atom involved in the polymerization of the polymerization initiator. As the coupling agent, one kind may be used alone, or two or more kinds may be used in combination.

The temperature of the above reaction is usually the same as that of the polymerization reaction, and is preferably from −30° C. to 150° C. When the reaction temperature is low, the viscosity of the polymer after coupling tends to increase. When the reaction temperature is high, the polymerization terminal tends to be deactivated. A reaction time is preferably 1 minute to 5 hours, and more preferably 2 minutes to 1 hour.

In the coupling reaction for obtaining the present polymer, a coupling rate is preferably 40% or more, more preferably 50% or more, and still more preferably 70% or more, as the coupling rate allows for improving oil resistance, suppression of increase in adhesiveness, and expandability of the composition containing the present polymer, and from the viewpoint that the coupling rate allows a network structure to be efficiently formed by a reaction with the crosslinking agent. From the viewpoint of obtaining a polymer composition having good processability, the coupling rate is preferably 90% or less, and more preferably 85% or less. As used herein, the term "coupling rate" refers to the ratio of a polymer bonding via the coupling agent to the polymer used in the reaction with the coupling agent (that is, the polymer chain $P^1$, which is to constitute the present polymer). The coupling rate can be calculated from a peak area ratio of a GPC curve obtained using gel permeation chromatography (GPC).

When the coupling rate is less than 100%, a polymer mixture containing a polymer (hereinafter, also referred to as a "first polymer") having a structure in which two or more polymer chain $P^1$s bond to a partial structure E derived from the coupling agent and containing a polymer (hereinafter, also referred to as a "second polymer") having only one polymer chain $P^1$ is obtained as the present polymer. The polymer mixture may be used as it is in the next hydrogenation step, or may be used in the next hydrogenation step after purification.

(Hydrogenation Step)

In this step, the block polymer obtained by the coupling step is hydrogenated. Methods and conditions of the hydrogenation reaction may be any method and condition as long as a block polymer having a desired hydrogenation rate can be obtained. Specific examples of the hydrogenation method include a method in which a catalyst containing an organometallic compound of titanium as a main component is used as a hydrogenation catalyst, a method in which a catalyst containing an organometallic compound of iron, nickel or cobalt and an organometallic compound such as alkylaluminum is used, a method in which an organic complex of an organometallic compound of ruthenium or rhodium is used, and a method in which a catalyst in which a metal such as palladium, platinum, ruthenium, cobalt or nickel is supported on a support such as carbon, silica, or alumina is used. Among the various methods, a method of performing hydrogenation under mild conditions of low pressure and low temperature using an organometallic compound of titanium alone or a homogeneous catalyst containing an organometallic compound of titanium and an organometallic compound of lithium, magnesium, or aluminum (JP-B-S63-4841 and JP-B-H1-37970) is industrially preferable, and the hydrogenation selectivity to a double bond of butadiene is also high and suitable.

The hydrogenation of the block polymer is preferably performed using a solvent which is inert to a catalyst and is capable of dissolving the block polymer. Preferred examples of the solvent include aliphatic hydrocarbons (for example, n-pentane, n-hexane, and n-octane), alicyclic hydrocarbons (for example, cyclohexane and cycloheptane), aromatic hydrocarbons (for example, benzene and toluene), and ethers (for example, diethyl ether and tetrahydrofuran), which may be used alone or as mixtures containing these as main components.

The hydrogenation reaction is generally performed by holding the block polymer at a predetermined temperature in a hydrogen or inert atmosphere, adding a hydrogenation catalyst with stirring or non-stirring, and then introducing hydrogen gas to pressurize the block polymer at a predetermined pressure. The inert atmosphere means an atmosphere which does not react with any components that participate in the hydrogenation reaction and includes helium, neon, argon, or the like. Air and oxygen may oxidize the catalyst to deactivate the catalyst. In addition, nitrogen may act as a catalytic poison during the hydrogenation reaction, and may reduce hydrogenation activity. Therefore, the inside of the hydrogenation reactor is preferably under an atmosphere of hydrogen gas alone.

A hydrogenation reaction process for obtaining the block polymer may be any of a batch process, a continuous process, and a combination thereof. When a titanocene diaryl-based compound is used as the hydrogenation catalyst, the titanocene diaryl-based compound may be added alone to the reaction solution as it is, or may be added as a solution of the titanocene diaryl-based compound in an inert organic solvent. The amount of the catalyst to be added is, for example, 0.02 to 20 mmol per 100 g of the block polymer before hydrogenation.

From the viewpoint of improving the suppression of increase in adhesiveness of the polymer, the expandability and the solvent resistance, the hydrogenation rate of the present polymer is preferably 75% or more, more preferably 80% or more, still more preferably 85% or more, yet still more preferably 90% or more, yet still more preferably 95% or more, and particularly preferably 97% or more. The hydrogenation rate of the present polymer is preferably 99% or less, from the viewpoint of ensuring the peel strength and tackiness of the polymer.

After the hydrogenation, the catalyst residue is removed, or a phenol-based or amine-based antioxidant is added, if necessary, and then a hydrogenated conjugated diene-based polymer (that is, the present polymer) is isolated from a polymer solution. Isolation of the polymer can be performed, for example, by a method in which acetone, alcohol, or the like is added to the polymer solution to precipitate the polymer, a method in which the polymer solution is put into boiling water with stirring, and the solvent is removed by distillation.

A weight average molecular weight (Mw) of the present polymer in terms of polystyrene as measured by the gel permeation chromatography (GPC) is preferably $5.0 \times 10^4$ to $7.0 \times 10^5$. When the Mw is $5.0 \times 10^4$ or more, mechanical properties are excellent, and adhesive residue is less likely to occur when the polymer having the Mw is used in the adhesive applications. When the Mw is $7.0 \times 10^5$ or less, fluidity of the present polymer can be sufficiently ensured and the molding processability can be improved, and the heat resistance and the solvent resistance can be sufficiently ensured by the reaction with the crosslinking agent. Thus, the Mw is preferable. The Mw of the present polymer is more preferably $7.0 \times 10^4$ or more, still more preferably $1.0 \times 10^5$ or more. The Mw of the present polymer is more preferably $6.5 \times 10^5$ or less. The weight average molecular weight of the polymer herein refers to the weight average molecular weight (total weight average molecular weight) based on all peaks.

(Post-Modification Step)

The block polymer after the hydrogenation reaction may be used as it is for a desired application. The block polymer after the hydrogenation reaction may be further subjected to a modification treatment (post-modification step). Such a modification treatment is preferable, as the modification treatment can further improve suppression of increase in adhesiveness of the present polymer and the expandability. In particular, in the polymer in which a primary amine or a secondary amine is introduced into a terminal by the modification treatment, a modification ratio of a modifying agent in the post-modification step (hereinafter, also referred to as a "post-modifying agent") is improved, and generation of residues of the post-modifying agent can be suppressed. For this reason, performing the post-modification step is preferable from the viewpoint of suppressing contamination of the adherend due to re-peeling and diffusion of a contamination component to the adherend due to permanent adhesion.

As the post-modifying agent, a compound having at least one functional group selected from the group formed of an alkoxysilyl group, a carboxy group, an amino group, a hydroxy group, an epoxy group, and a group derived from an acid anhydride can be preferably used. Specific examples of such a post-modifying agent include dimethyldiethoxysilane, tetramethoxysilane, tetraethoxysilane, 3-aminopropyltriethoxysilane, vinyltrimethoxysilane, vinyltriethoxysilane, hydroxymethyltriethoxysilane, vinylbenzyldiethylamine, vinylbenzyldimethylamine, 1-glycidyl-4-(2-pyridyl)piperazine, 1-glycidyl-4-phenylpiperazine, 1-glycidyl-4-methylpiperazine, 1-glycidyl-4-methylhomopiperazine, 1-glycidylhexamethyleneimine, and tetraglycidyl-1,3-bisaminomethylcyclohexane. Examples of the post-modifying agent include unsaturated carboxylic acid anhydrides such as maleic anhydride, citraconic anhydride, 2,3-dimethylmaleic anhydride, and itaconic anhydride. The post-modifying agent may be used alone or in combination of two or more kinds thereof.

The reaction between the hydrogenated block polymer and the post-modifying agent is performed, for example, in a state where the hydrogenated block polymer is melted using an extruder or the like, preferably in the presence of a catalyst (for example, a radical generator such as an organic peroxide). In the reaction between the block polymer and the post-modifying agent after the hydrogenation reaction, the usage ratio of the post-modifying agent is preferably 0.05 parts by mass or more, and more preferably 0.1 parts by mass or more, with respect to 100 parts by mass of the block polymer. From the viewpoint of avoiding excessive addition of the post-modifying agent while allowing the reaction to sufficiently proceed, the usage ratio of the post-modifying agent is preferably 10 parts by mass or less, and more preferably 5 parts by mass or less, with respect to 100 parts by mass of the block polymer. The temperature during the reaction is, for example, 100 to 300° C.

Alternatively, the hydrogenated block polymer and a composition containing the crosslinking agent may be allowed to react with each other while being subjected to shear deformation to crosslink the hydrogenated block polymer. Forming a crosslinked structure in the hydrogenated block copolymer can further improve the solvent resistance and the mechanical strength. As the crosslinking agent, a compound having two or more functional groups capable of reacting with the functional group F can be preferably used. Examples of such a crosslinking agent include an isocyanate-based crosslinking agent, an epoxy-based crosslinking agent, an aziridine-based crosslinking agent, a melamine-based crosslinking agent, an aldehyde-based crosslinking agent, an amine-based crosslinking agent, a chelate-based crosslinking agent, a carbodiimide-based crosslinking agent, a hydroxyl group-containing compound, an acid compound, an acid anhydride, and a radical generator.

Examples of the isocyanate-based crosslinking agent include aromatic isocyanate-based crosslinking agents such as tolylene diisocyanate-based crosslinking agents such as 2,4-tolylene diisocyanate and 2,6-tolylene diisocyanate, xylylene diisocyanate-based crosslinking agents such as 1,3-xylylene diisocyanate, diphenylmethane-based crosslinking agents such as diphenylmethane-4,4-diisocyanate, and naphthalene diisocyanate-based crosslinking agents such as 1,5-naphthalene diisocyanate; alicyclic isocyanate-based crosslinking agents such as isophorone diisocyanate, 1,4-cyclohexane diisocyanate, 4,4'-dicyclohexylmethane diisocyanate, methylcyclohexane diisocyanate, isopropylidene dicyclohexyl-4,4'-diisocyanate, 1,3-diisocyanatomethylcyclohexane, and norbornane diisocyanate; aliphatic isocyanate-based crosslinking agents such as hexamethylene diisocyanate and trimethylhexamethylene diisocyanate; and adducts, burettes, and isocyanurates of the isocyanate-based compounds.

Examples of the epoxy-based crosslinking agent include bisphenol A-epichlorohydrin epoxy resins, ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, sorbitol polyglycidyl ether, polyglycerol polyglycidyl ether, pentaerythritol polyglycidyl ether, and diglycerol polyglycidyl ether.

Examples of the aziridine-based crosslinking agent include tetramethylolmethane-tri-β-aziridinyl propionate, trimethylolpropane-tri-β-aziridinyl propionate, N,N'-diphenylmethane-4,4'-bis (1-aziridinecarboxyamide), and N,N'-hexamethylene-1,6-bis(1-aziridinecarboxyamide).

Examples of the melamine-based crosslinking agent include hexamethoxymethylmelamine, hexaethoxymethylmelamine, hexapropoxymethylmelamine, hexabutoxymethylmelamine, hexapentyloxymethylmelamine, hexyloxymethylmelamine, and melamine resins.

Examples of the aldehyde-based crosslinking agent include glyoxal, malonedialdehyde, succinedialdehyde, maleindialdehyde, glutaradialdehyde, formaldehyde, acetaldehyde, and benzaldehyde.

Examples of the amine-based crosslinking agent include hexamethylenediamine, triethyldiamine, polyethyleneimine, hexamethylenetetraamine, diethylenetriamine, triethyltetraamine, isophoronediamine, an amino resin, and polyamide.

Examples of the metal chelate-based crosslinking agent include acetylacetone and acetoacetyl ester coordination compounds of polyvalent metals such as aluminum, iron, copper, zinc, tin, titanium, nickel, antimony, magnesium, panalium, chromium, and zirconium.

Examples of the carbodiimide-based crosslinking agent include a polyfunctional carbodiimide compound and a polymer-based carbodiimide compound.

Examples of the hydroxyl group-containing compound include a polyether polyol, a polyester polyol, an acrylic polyol, a polybutadiene polyol, and a polyisoprene polyol.

Examples of the polyfunctional crosslinking agent containing a carboxy group include aromatic dicarboxylic acids such as α-phthalic acid, isophthalic acid, terephthalic acid, 1,4-dimethylterephthalic acid, 1,3-dimethylisophthalic acid, 5-sulfo-1,3-dimethylisophthalic acid, 4,4-biphenyldicarboxylic acid, 1,4-naphthalenedicarboxylic acid, 2,6-naphthalenedicarboxylic acid, norbornenedicarboxylic acid, diphenylmethane-4,4'-dicarboxylic acid, and phenylindanedicarboxylic acid; aromatic dicarboxylic acid anhydrides such as phthalic anhydride, 1,8-naphthalenedicarboxylic acid anhydride, and 2,3-naphthalenedicarboxylic acid anhydride; alicyclic dicarboxylic acids such as hexahydrophthalic acid; alicyclic dicarboxylic acid anhydrides such as hexahydrophthalic anhydride, 3-methyl-hexahydrophthalic anhydride, 4-methyl-hexahydrophthalic anhydride, and 1,2-cyclohexanedicarboxylic anhydride; and aliphatic dicarboxylic acids such as oxalic acid, malonic acid, succinic acid, adipic acid, sebacic acid, azelaic acid, suberic acid, maleic acid, chloromaleic acid, fumaric acid, dodecanedioic acid, pimelic acid, citraconic acid, glutaric acid, and itaconic acid.

Examples of the acid anhydride include pyromellitic anhydride, benzophenonetetracarboxylic dianhydride, biphenyltetracarboxylic dianhydride, oxydiphthalic dianhydride, diphenylsulfonetetracarboxylic dianhydride, diphenylsulfide tetracarboxylic dianhydride, butanetetracarboxylic dianhydride, perylenetetracarboxylic dianhydride, and naphthalenetetracarboxylic dianhydride.

The radical generator is used to generate radicals by heating or irradiating light such as ultraviolet rays when the adhesive layer constituting a part of an adhesive film is produced. The present polymer can be crosslinked by generating the radicals. The radical generator is preferably a photoradical generator that generates the radicals by irradiation with light such as ultraviolet rays. Specific examples of the photoradical generator include hydroxyketones, benzyl dimethyl ketals, aminoketones, acylphosphine oxides, and benzophenones. The photoradical generators may be used alone or in combination of two or more.

The radical generator may be an oligomer type photoradical generator. The oligomer type photoradical generator is a low molecular weight polymer of a monomer having a functional group capable of generating the radicals by irradiation with light such as the ultraviolet rays. Such an oligomer type photoradical generator has two or more radical generation points in one molecule, is hardly affected by crosslinking inhibition by oxygen and can be used for crosslinking treatment in a small amount. Such an oligomer type photoradical generator is not scattered even in a solvent-free hot melt state at the time of coating on a substrate and is not extracted from a polymer. From the above viewpoints, such an oligomer type photoradical generator is preferable.

Specific examples of the oligomer type photoradical generator include an oligomer obtained by polymerizing acrylated benzophenone (manufactured by UCB, trade name: "Ebecryl P36"), an oligomer obtained by polymerizing a reaction product of a primary hydroxyl group of 1-[4-(2-hydroxyethoxy)phenyl]-2-hydroxy-2-methyl-1-propan-1-one (manufactured by BASF, trade name: "Irgacure 2959") and 2-isocyanatoethyl methacrylate, and 2-hydroxy-2-methyl[4-(1-methylvinyl)phenyl]propanol oligomer (manufactured by Lamberti, trade name: "Esacure KIP150"). A molecular weight of the oligomer type photoradical generator is preferably about 50,000 or less.

The crosslinking agent may be used alone or in combination of two or more kinds thereof. The amount of the crosslinking agent to be used can be appropriately determined depending on performance required for a target final composition. The amount of the crosslinking agent to be used is usually from 0.1 to 20 parts by mass, preferably from 0.2 to 10 parts by mass, with respect to 100 parts by mass of the present polymer. The reaction between the present polymer and the crosslinking agent may be performed in the presence of a curing catalyst, if necessary.

<<Adhesive>>

The present polymer has excellent adhesive performance, and thus, the present polymer is suitable for use in the adhesive applications. The adhesive obtained by using the present polymer may contain only one kind of the present polymer, or may contain two or more kinds thereof. A polymer mixture of the first polymer and the second polymer described above can also be used as an adhesive material. In the polymer mixture of the first polymer and the second polymer, the polymer obtained by the series of operations of the polymerization step, the coupling step, and the hydrogenation step described above can be used as it is, and furthermore, excellent adhesive performance is exhibited. Therefore, the polymer mixture has high productivity and is industrially advantageous.

In the adhesive containing the present polymer (hereinafter, also referred to as "present adhesive"), a content ratio of the present polymer (that is, the first polymer) is preferably 10 to 90 mass % with respect to the total amount (100 mass %) of the adhesive, from the viewpoint of exhibiting excellent adhesive performance. The ratio of the present polymer is more preferably 20 mass % or more, still more preferably 40 mass % or more, with respect to the total amount of the adhesive. The ratio of the first polymer with respect to the total amount of the adhesive is more preferably 85 mass % or less, and still more preferably 80 mass % or less.

A ratio of the total amount of the first polymer and the second polymer contained in the present adhesive is preferably 40 mass % or more, more preferably 60 mass % or more, and still more preferably 70 mass % or more, with respect to the total amount of the present adhesive, from the viewpoint of exhibiting excellent adhesive performance. The present polymer to be blended in the present adhesive may be used alone or in combination of two or more kinds thereof.

The present adhesive may be formed only of the present polymer or may further contain a component different from the present polymer (hereinafter, also referred to as "another component"). Examples of another component include a tackifier in addition to the second polymer. Blending the tackifier to the present adhesive allows for improving the initial adhesive strength of the adhesive.

As the tackifier, those generally used in adhesive applications, such as petroleum resins (for example, aliphatic copolymers, aromatic copolymers, aliphatic and aromatic copolymers, and alicyclic copolymers), coumarone-indene resins, terpene resins, terpene phenol resins, rosin resins, (alkyl)phenol resins, xylene resins, and hydrogenated products of these, can be used. The tackifier may be used alone or in combination of two or more kinds thereof.

In addition to the above, examples of another components include a polyolefin-based resin, an antioxidant, an ultraviolet absorber, a colorant, a light stabilizer, a thermal polymerization inhibitor, an antifoaming agent, a leveling agent, an antistatic agent, a surfactant, a storage stabilizer, an antioxidant, a flame retardant, and various fillers. In the present adhesive, a blending ratio of another component can be appropriately set according to each component as long as the effect of the present disclosure is not impaired.

The present polymer is excellent in various properties such as initial adhesiveness, low increase in adhesiveness, expandability, adhesive residue suppression, and solvent resistance, and thus can be used for various applications. Specifically, in addition to the adhesive layer of the surface protective film, the adhesive layer of the adhesive film of the structure, and a modifier of a resin composition, the present polymer can also be used as a molded article. Furthermore, the present polymer is excellent in vibration damping properties, and can be used for various applications such as a vibration damping material, a vibration damping film, and a vibration damping sheet.

The present disclosure also provides a laminate including an X layer containing the present polymer and a Y layer laminated on at least one surface of the X layer. As such a laminate, for example, laminated glass is suitable. Specifically, by forming the X layer as an interlayer film for laminated glass, the Y layer as a glass layer, and laminating the layers to form the laminated glass, not only excellent vibration damping properties but also excellent sound insulation can be expected. In addition to the glass layer, the Y layer can be appropriately selected according to various applications. Examples of the application include a laminate in which a layer containing a thermoplastic resin other than the present polymer is a Y layer. Examples of such a thermoplastic resin include a polyvinyl acetal resin, an ionomer, an ethylene-vinyl acetate copolymer, a urethane resin, and a polyamide resin.

Other applications of the present polymer include, for example, the following applications.

(1) Pelet, bail, sound absorbing material, sound insulating material, dam rubber, shoe sole material, floor material, weather strip, floor mat, dash insulator, roof lining, door panel, engine head cover, door hole seal, fender liner, and the like.

(2) Various products in the field of automobiles: for example, cooling components such as a thermostat housing, a radiator tank, a radiator hose, a water outlet, a water pump housing, and a rear joint; intake and exhaust system components such as an intercooler tank, an intercooler case, a turbo duct pipe, an EGR cooler case, a resonator, a throttle body, an intake manifold, and a tail pipe; fuel system components such as a fuel delivery pipe, a gasoline tank, a quick connector, a canister, a pump module, a fuel pipe, an oil strainer, a lock nut, and a sealing material; structural components such as a mount bracket, a torque rod, and a cylinder head cover; drive system components such as a bearing retainer, a gear retainer, a lamp head gear, an HVAC gear, a slide door roller, and a clutch peripheral component; brake system components such as an air brake tube; in-vehicle electric components such as a wire connector, a motor component, a sensor, an ABS, a combination switch, an in-vehicle switch, and an electronic control unit (ECU) box in an engine room; interior and exterior components such as a slide door damper, a door laminator stay, a door mirror bracket, a mirror stay, a roof mount rail, an engine bracket, and an air cleaner; inner and outer components such as a door checker, a door chain checker, a plastic chain, an emblem, a breaker cover, a breaker grill, an air louver, an air louver, a bulge, a bulge, a back door, a back door, a back door, a fuel sender module, a fuel sender module, a floor mat, a dashboard, a dashboard, and tires.

(3) Various products in the field of home electric appliances: for example, a sealing material, an adhesion agent, an adhesive, a packing, an O-ring, a belt, a sound insulating material, and the like in various electric products such as various recorders such as televisions, Blu-ray recorders, and HDD recorders, projectors, game machines, digital cameras, home videos, antennas, speakers, electronic dictionaries, IC recorders, facsimiles, copiers, telephones, door phones, rice cookers, microwave ovens, refrigerators, dishwasher machines, dishdriers, IH cooking heaters, hot plates, cleaners, washing machines, chargers, sewing machines, irons, dryers, electric bicycles, air cleaners, water purifiers, electric toothbrushes, lighting fixtures, air conditioners, outdoor machines of air conditioners, dehumidifiers, and humidifiers.

The present polymer can also be used as a modifier for improving properties such as toughness and impact resistance of the thermoplastic resin. Examples of the thermoplastic resin in which the present polymer is blended as a modifier include polypropylene, polyethylene, polystyrene, polycarbonate, polyester, polyarylene, polyarylene ether, polyarylene sulfide, polyamide, polyimide, and ABS resin.

EXAMPLES

Hereinafter, the present invention will be specifically described based on Examples, whereas the present invention is not limited to the Examples. In Examples and Comparative Examples, "part(s)" and "%" are based on mass unless otherwise specified.

1. Physical Property Measurement Method

Methods for measuring various physical properties of the polymer are as follows.

[Vinyl Bond Content]: Using the polymer before hydrogenation, calculation was performed from a $^1$H-NMR spectrum measured with a 500 MHz device.

[1st Peak Weight Average Molecular Weight]: A holding time of a peak having the longest holding time in a GPC curve obtained using gel permeation chromatography (GPC) (HLC-8120GPC (product name (manufactured by Tosoh Corporation))) was determined in terms of polystyrene.

(GPC Conditions)
Column: Product name "GMHXL" (manufactured by Tosoh Corporation), two columns
Column temperature: 40° C.
Mobile phase: tetrahydrofuran
Flow rate: 1.0 ml/min
Sample concentration: 10 mg/20 ml

[Total Weight Average Molecular Weight]: Polystyrene conversion was obtained from the GPC curve obtained by using the GPC (HLC-8120GPC (product name (manufactured by Tosoh Corporation))).

[Coupling Rate]: The coupling rate was calculated from a peak area ratio of the GPC curve obtained using the GPC (HLC-8120GPC (product name (manufactured by Tosoh Corporation))).

[Hydrogenation Rate]: The hydrogenation rate was calculated from the $^1$H-NMR spectrum measured with the 100 MHz device using ethylene tetrachloride as a solvent.

2. Production of Polymer

[Example 1]: Production of Polymer (A-1)

A nitrogen-substituted reaction vessel was charged with 800 parts of degassed and dehydrated cyclohexane, 0.03 parts of tetrahydrofuran, 0.14 parts of piperidine, and 0.14 parts of n-butyllithium, and 30 parts of 1,3-butadiene was added to the reaction vessel at a polymerization initiation temperature of 70° C. to perform temperature rising polymerization. After a polymerization conversion rate reached 99% or more, a reaction solution was cooled to 20° C., 70 parts of 1,3-butadiene and 16 parts of tetrahydrofuran were added to the reaction solution, and further temperature rising polymerization was performed. After the polymerization conversion rate reached 99% or more, 0.06 parts of tetrachlorosilane was added, and further temperature rising polymerization was performed. The obtained block polymer was a block polymer having a polymer block A containing a structural unit derived from 1,3-butadiene and having a vinyl bond content of 15 mol %, and a polymer block B containing the structural unit derived from 1,3-butadiene and having the vinyl bond content of 75 mol %. In the obtained block polymer, a 1st peak weight average molecular weight was 100,000, the total weight average molecular weight was 300,000, and the coupling rate was 75%.

Thereafter, 0.05 parts of diethylaluminum chloride and 0.11 parts of bis(cyclopentadienyl) titanium furyloxychloride were added to the reaction vessel, and the mixture was stirred. A hydrogenation reaction was started at hydrogen gas supply pressure of 0.7 MPa-Gauge and a reaction temperature of 80° C., after 3.0 hours, a reaction solution was taken out from the reaction vessel at 60° C. and normal pressure, and the reaction solution was stirred and introduced into water to remove the solvent by steam distillation, thereby obtaining a block polymer (hereinafter referred to as a block polymer (A-1)) in which the hydrogenation rate of a conjugated diene portion was 98%. Various physical properties and the like of the obtained block polymer (A-1) are shown in Table 1.

[Example 2]: Production of Polymer (A-2)

A block polymer (hereinafter referred to as a block polymer (A-2)) in which the hydrogenation rate of the conjugated diene portion was 90% was obtained by performing the same manner as the polymer (A-1), except that an amount of hydrogen supplied in the hydrogenation reaction was reduced. Various physical properties and the like of the obtained block polymer (A-2) are shown in Table 1.

[Example 3]: Production of Polymer (A-3)

A nitrogen-substituted reaction vessel was charged with 800 parts of degassed and dehydrated cyclohexane, 0.03 parts of tetrahydrofuran, 0.07 parts of piperidine, and 0.09 parts of n-butyllithium, and 30 parts of 1,3-butadiene was added to the reaction vessel at a polymerization initiation temperature of 70° C. to perform temperature rising polymerization. After a polymerization conversion rate reached 99% or more, a reaction solution was cooled to 20° C., 70 parts of 1,3-butadiene and 16 parts of tetrahydrofuran were added to the reaction solution, and further temperature rising polymerization was performed. After the polymerization conversion rate reached 99% or more, 0.06 parts of methyldichlorosilane was added, and further temperature rising polymerization was performed. The obtained block polymer was a block polymer having a polymer block A containing a structural unit derived from 1,3-butadiene and having a vinyl bond content of 15 mol %, and a polymer block B containing the structural unit derived from 1,3-butadiene and having the vinyl bond content of 75 mol %. In the obtained block polymer, a 1st peak weight average molecular weight was 180,000, the total weight average molecular weight was 300,000, and the coupling rate was 75%.

Thereafter, 0.05 parts of diethylaluminum chloride and 0.11 parts of bis(cyclopentadienyl) titanium furyloxychloride were added to the reaction vessel, and the mixture was stirred. A hydrogenation reaction was started at hydrogen gas supply pressure of 0.7 MPa-Gauge and a reaction temperature of 80° C., after 3.0 hours, a reaction solution was taken out from the reaction vessel at 60° C. and normal pressure, and the reaction solution was stirred and introduced into water to remove the solvent by steam distillation, thereby obtaining a block polymer (hereinafter referred to as a block polymer (A-3)) in which the hydrogenation rate of a conjugated diene portion was 98%. Various physical properties and the like of the obtained block polymer (A-3) are shown in Table 1.

[Example 4]: Production of Polymer (A-4)

A nitrogen-substituted reaction vessel was charged with 800 parts of degassed and dehydrated cyclohexane, 0.03 parts of tetrahydrofuran, 0.14 parts of piperidine, and 0.14 parts of n-butyllithium, and 30 parts of 1,3-butadiene was added to the reaction vessel at a polymerization initiation temperature of 70° C. to perform temperature rising polymerization. After the polymerization conversion rate reached 99% or more, the reaction solution was cooled to 20° C., and 50 parts of 1,3-butadiene, 20 parts of styrene, and 20 parts of tetrahydrofuran were added to the reaction solution, and further temperature rising polymerization was performed. After the polymerization conversion rate reached 99% or more, 0.06 parts of tetrachlorosilane was added, and further temperature rising polymerization was performed. The obtained block polymer was a block polymer having a polymer block A containing a structural unit derived from 1,3-butadiene and having a vinyl bond content of 15 mol %, and a polymer block B containing a structural unit derived from 1,3-butadiene and styrene and having a vinyl bond content of 75 mol %. In the obtained block polymer, a 1st peak weight average molecular weight was 100,000, the total weight average molecular weight was 300,000, and the coupling rate was 75%.

Thereafter, 0.05 parts of diethylaluminum chloride and 0.11 parts of bis(cyclopentadienyl) titanium furyloxychloride were added to the reaction vessel, and the mixture was stirred. A hydrogenation reaction was started at hydrogen gas supply pressure of 0.7 MPa-Gauge and a reaction temperature of 80° C., after 3.0 hours, a reaction solution was taken out from the reaction vessel at 60° C. and normal pressure, and the reaction solution was stirred and introduced into water to remove the solvent by steam distillation, thereby obtaining a block polymer (hereinafter referred to as a block polymer (A-4)) in which the hydrogenation rate of a conjugated diene portion was 98%. Various physical properties and the like of the obtained block polymer (A-4) are shown in Table 1.

[Example 5]: Production of Polymer (A-5)

A nitrogen-substituted reaction vessel was charged with 800 parts of degassed and dehydrated cyclohexane, 0.03 parts of tetrahydrofuran, 0.25 parts of N-(tert-butyldimethylsilyl) piperazine, and 0.14 parts of n-butyllithium, and 30 parts of 1,3-butadiene was added to the reaction vessel at a polymerization initiation temperature of 70° C. to perform temperature rising polymerization. After the polymerization conversion rate reached 99% or more, a reaction solution was cooled to 20° C., 70 parts of 1,3-butadiene and 16 parts of tetrahydrofuran were added to the reaction solution, and further temperature rising polymerization was performed. After the polymerization conversion rate reached 99% or more, 0.06 parts of tetrachlorosilane was added, and further temperature rising polymerization was performed. The obtained block polymer was a block polymer having a polymer block A containing a structural unit derived from 1,3-butadiene and having a vinyl bond content of 15 mol %, and a polymer block B containing the structural unit derived from 1,3-butadiene and having the vinyl bond content of 75 mol %. In the obtained block polymer, a 1st peak weight average molecular weight was 100,000, the total weight average molecular weight was 300,000, and the coupling rate was 75%.

Thereafter, 0.05 parts of diethylaluminum chloride and 0.11 parts of bis(cyclopentadienyl) titanium furyloxychloride were added to the reaction vessel, and the mixture was stirred. A hydrogenation reaction was started at hydrogen gas supply pressure of 0.7 MPa-Gauge and a reaction temperature of 80° C., after 3.0 hours, a reaction solution was taken out from the reaction vessel at 60° C. and normal pressure, and the reaction solution was stirred and introduced into water to remove the solvent by steam distillation, thereby obtaining a block polymer (hereinafter referred to as a block polymer (A-5)) in which the hydrogenation rate of a conjugated diene portion was 98%. Various physical properties and the like of the obtained block polymer (A-5) are shown in Table 1.

[Example 6]: Production of Polymer (A-6)

A nitrogen-substituted reaction vessel was charged with 800 parts of degassed and dehydrated cyclohexane, 0.03 parts of tetrahydrofuran, 0.14 parts of piperidine, and 0.14 parts of n-butyllithium, and 30 parts of 1,3-butadiene was added to the reaction vessel at a polymerization initiation temperature of 70° C. to perform temperature rising polymerization. After the polymerization conversion rate reached 99% or more, a reaction solution was cooled to 20° C., 70 parts of 1,3-butadiene and 16 parts of tetrahydrofuran were added to the reaction solution, and further temperature rising polymerization was performed. After the polymerization conversion rate reached 99% or more, 0.19 parts of 1,1'-(1,4-phenylene)bis(N-(3-(triethoxysilyl)propyl)methaneimine) was added, and further temperature rising polymerization was performed. The obtained block polymer was a block polymer having a polymer block A containing a structural unit derived from 1,3-butadiene and having a vinyl bond content of 15 mol %, and a polymer block B containing the structural unit derived from 1,3-butadiene and having the vinyl bond content of 75 mol %. In the obtained block polymer, a 1st peak weight average molecular weight was 100,000, the total weight average molecular weight was 300,000, and the coupling rate was 75%.

Thereafter, 0.05 parts of diethylaluminum chloride and 0.11 parts of bis(cyclopentadienyl) titanium furyloxychloride were added to the reaction vessel, and the mixture was stirred. A hydrogenation reaction was started at hydrogen gas supply pressure of 0.7 MPa-Gauge and a reaction temperature of 80° C., after 3.0 hours, a reaction solution was taken out from the reaction vessel at 60° C. and normal pressure, and the reaction solution was stirred and introduced into water to remove the solvent by steam distillation, thereby obtaining a block polymer (hereinafter referred to as a block polymer (A-6)) in which the hydrogenation rate of a conjugated diene portion was 98%. The various physical properties and the like of the obtained block polymers (A-6) are shown in Table 1.

[Example 7]: Production of Polymer (A-7)

To 100 parts of the block polymer (A-5), 0.5 parts of maleic anhydride and 0.25 parts of an organic peroxide (t-butyl peroxybenzoate) were mixed for 5 minutes using a Henschel mixer. The obtained mixture was subjected to extrusion modification at a cylinder temperature of 200 to 240° C. using a 30-mm vented extruder to obtain a block polymer (hereinafter, referred to as a block polymer (A-7)). The various physical properties and the like of the obtained block polymers (A-7) are shown in Table 1.

[Example 8]: Production of Polymer (A-8)

A nitrogen-substituted reaction vessel was charged with 800 parts of degassed and dehydrated cyclohexane, 0.03 parts of tetrahydrofuran, 0.14 parts of piperidine, and 0.14 parts of n-butyllithium, and 30 parts of 1,3-butadiene was added to the reaction vessel at a polymerization initiation temperature of 70° C. to perform temperature rising polymerization. After the polymerization conversion rate reached 99% or more, a reaction solution was cooled to 20° C., 70 parts of 1,3-butadiene and 16 parts of tetrahydrofuran were added to the reaction solution, and further temperature rising polymerization was performed. After the polymerization conversion rate reached 99% or more, 0.03 parts of tetrachlorosilane was added, and further temperature rising polymerization was performed. The obtained block polymer was a block polymer having a polymer block A containing a structural unit derived from 1,3-butadiene and having a vinyl bond content of 15 mol %, and a polymer block B containing the structural unit derived from 1,3-butadiene and having the vinyl bond content of 75 mol %. In the obtained block polymer, the 1st peak weight average molecular weight was 100,000, the total weight average molecular weight was 200,000, and the coupling rate was 40%.

Thereafter, 0.05 parts of diethylaluminum chloride and 0.11 parts of bis(cyclopentadienyl) titanium furyloxychloride were added to the reaction vessel, and the mixture was stirred. A hydrogenation reaction was started at hydrogen gas supply pressure of 0.7 MPa-Gauge and a reaction temperature of 80° C., after 3.0 hours, a reaction solution was taken out from the reaction vessel at 60° C. and normal pressure, and the reaction solution was stirred and introduced into water to remove the solvent by steam distillation, thereby obtaining a block polymer (hereinafter referred to as a block polymer (A-8)) in which the hydrogenation rate of a conjugated diene portion was 98%. The various physical properties and the like of the obtained block polymers (A-8) are shown in Table 1.

[Example 9]: Production of Polymer (A-9)

A nitrogen-substituted reaction vessel was charged with 800 parts of degassed and dehydrated cyclohexane, 0.03 parts of tetrahydrofuran, 0.14 parts of piperidine, and 0.14 parts of n-butyllithium, and 30 parts of 1,3-butadiene was added to the reaction vessel at a polymerization initiation temperature of 70° C. to perform temperature rising polymerization. After the polymerization conversion rate reached 99% or more, a reaction solution was cooled to 20° C., 70 parts of 1,3-butadiene and 1.5 parts of tetrahydrofuran were added to the reaction solution, and further temperature rising polymerization was performed. After the polymerization conversion rate reached 99% or more, 0.06 parts of tetrachlorosilane was added, and further temperature rising polymerization was performed. The obtained block polymer was a block polymer having a polymer block A containing a structural unit derived from 1,3-butadiene and having a vinyl bond content of 15 mol %, and a polymer block B containing the structural unit derived from 1,3-butadiene and having the vinyl bond content of 45 mol %. In the obtained block polymer, the 1st peak weight average molecular weight was 100,000, the total weight average molecular weight was 300,000, and the coupling rate was 75%.

Thereafter, 0.05 parts of diethylaluminum chloride and 0.11 parts of bis(cyclopentadienyl) titanium furyloxychloride were added to the reaction vessel, and the mixture was stirred. A hydrogenation reaction was started at hydrogen gas supply pressure of 0.7 MPa-Gauge and a reaction temperature of 80° C., after 3.0 hours, a reaction solution was taken out from the reaction vessel at 60° C. and normal pressure, and the reaction solution was stirred and introduced into water to remove the solvent by steam distillation, thereby obtaining a block polymer (hereinafter referred to as a block polymer (A-9)) in which the hydrogenation rate of a conjugated diene portion was 98%. The various physical properties and the like of the obtained block polymers (A-9) are shown in Table 1.

[Comparative Production Example 1]: Production of Polymer (A-10)

A block polymer (hereinafter, referred to as a block polymer (A-10)) was obtained by performing the same manner as the polymer (A-1) except that piperidine was not added. The various physical properties and the like of the obtained block polymers (A-10) are shown in Table 1.

[Comparative Production Example 2]: Production of Polymer (A-11)

A block polymer (hereinafter, referred to as a block polymer (A-11)) in which the hydrogenation rate of the conjugated diene portion was 60% was obtained by performing the same manner as the polymer (A-1) except that an amount of hydrogen supplied in the hydrogenation reaction was reduced. The various physical properties and the like of the obtained block polymers (A-11) are shown in Table 1.

[Comparative Production Example 3]: Production of Block Polymer (A-12)

A nitrogen-substituted reaction vessel was charged with 800 parts of degassed and dehydrated cyclohexane, 0.03 parts of tetrahydrofuran, and 0.09 parts of n-butyllithium, and 30 parts of styrene was added to the reaction vessel at a polymerization initiation temperature of 70° C. to perform temperature rising polymerization. After the polymerization conversion rate reached 99% or more, a reaction solution was cooled to 20° C., 70 parts of 1,3-butadiene and 16 parts of tetrahydrofuran were added to the reaction solution, and further temperature rising polymerization was performed. After the polymerization conversion rate reached 99% or more, 0.06 parts of methyldichlorosilane was added, and further temperature rising polymerization was performed. The obtained block polymer was a block polymer that did not contain the polymer block A and contained a polymer block C formed of a structural unit derived from styrene and the polymer block B containing a structural unit derived from 1,3-butadiene and having a vinyl bond content of 75 mol %. In the obtained block polymer, a 1st peak weight average molecular weight was 180,000, the total weight average molecular weight was 300,000, and the coupling rate was 75%.

Thereafter, 0.05 parts of diethylaluminum chloride and 0.11 parts of bis(cyclopentadienyl) titanium furyloxychloride were added to the reaction vessel, and the mixture was stirred. A hydrogenation reaction was started at hydrogen gas supply pressure of 0.7 MPa-Gauge and a reaction temperature of 80° C., after 3.0 hours, a reaction solution was taken out from the reaction vessel at 60° C. and normal pressure, and the reaction solution was stirred and introduced into water to remove the solvent by steam distillation, thereby obtaining a block polymer (hereinafter referred to as a block polymer (A-12)) in which the hydrogenation rate of a conjugated diene portion was 98%. The various physical properties and the like of the obtained block polymers (A-12) are shown in Table 1.

[Comparative Production Example 4]: Production of Block Polymer (A-13)

To 100 parts of the block polymer (A-12), 0.5 parts of maleic anhydride and 0.25 parts of an organic peroxide (t-butyl peroxybenzoate) were mixed for 5 minutes using a Henschel mixer. The obtained mixture was subjected to extrusion modification at a cylinder temperature of 200 to 240° C. using a 30-mm vented extruder to obtain a block polymer (hereinafter, referred to as a block polymer (A-13)). The various physical properties and the like of the obtained block polymers (A-13) are shown in Table 1.

3. Evaluation of Adhesive Performance

[Production of Adhesive Film]

Polypropylene (J715M, manufactured by Prime Polymer Corporation) was used as a substrate layer, and a final product obtained in Example 1 (a mixture of the multi-branched block polymer (A-1) and the unreacted block polymer that was not used for the coupling reaction) was used as an adhesive layer, and the polypropylene and the final product were co-extruded and molded by a T-die method (extrusion temperature: 200 to 230° C., cooling roll: about 50° C.) to form an adhesive film in which the substrate layer having a thickness of 40 μm and the adhesive layer having a thickness of 12 μm were integrally laminated. The adhesive film was wound around a paper core having an inner diameter of 3 inches to obtain a film roll.

Similarly, using the final products obtained in Examples 2 to 9 and Comparative Production Examples 1 to 4, respectively, an adhesive film was molded in the same manner as in Example 1, and wound around a paper core having an inner diameter of 3 inches to obtain the film roll.

For each of the obtained adhesive films, the following items (1) to (5) were evaluated.

(1) Peel Strength

Each of the adhesive films in Examples and Comparative Examples was attached to a SUS plate (SUS mirror surface plate) whose surface is polished so as to have a surface roughness of 0.5 to 1.0 m at a pressure of $5.9 \times 10^5$ Pa and a speed of 30 mm/min using a table laminator in an environment of a room temperature of 23° C. and a relative humidity of 50%. After each produced film was allowed to stand for 30 minutes in the environment, 180-degree peel strength of each film (25 mm width) was measured at a rate of 300 mm/min in accordance with the method of JIS Z0237: 2009, and the strength of each film was defined as an initial peel strength. The peel strength was determined from the obtained initial peel strength in accordance with the following four determination criteria A to D.

A: 0.30 N/10 mm or more, and the peel strength was extremely good.

B: 0.15 N/10 mm or more and less than 0.30 N/10 mm, and the peel strength was good.

C: 0.05 N/10 mm or more and less than 0.15 N/10 mm, and the peel strength was at an allowable level.

D: less than 0.05 N/10 mm, and the peel strength was poor.

(2) Low Increase in Adhesiveness

Each of the adhesive films in Examples and Comparative Examples was attached to the surface of a plate similar to the SUS plate used in the peel strength evaluation of the above (1) using the table laminator in an environment of a room temperature of 23° C. and a relative humidity of 50% at a pressure of $5.9 \times 10^5$ Pa and a speed of 30 mm/min. Subsequently, each produced film was allowed to stand at 60° C. for 30 minutes or at 60° C. for 1 week, and the 180-degree peel strength of each film (25 mm width) was measured at a rate of 300 mm/min in accordance with the method of JISZ0237. The measured 180-degree peel strength of each film after allowed to stand at 60° C. for 30 minutes was defined as the initial peel strength, and the measured 180-degree peel strength of each film after allowed to stand at 60° C. for 1 week was defined as a peel strength over time. From the initial peel strength, a change ratio in peel strength over time (ratio of the increase in adhesiveness) was calculated by the following equation (a).

Change ratio (ratio of the increase in adhesiveness)= (peel strength over time/initial peel strength)  (a)

From the obtained change ratio (ratio of the increase in adhesiveness), the increase in adhesiveness was determined in accordance with the following four determination criteria from A to D.

A: The ratio of the increase in adhesiveness was in a range of 1.2 or less, and the low increase in adhesiveness was extremely good.

B: The ratio of the increase in adhesiveness was in the range of more than 1.2 and 1.6 or less, and the low increase in adhesiveness was good.

C: The ratio of the increase in adhesiveness was in a range of more than 1.6 and 2.0, and the increase in adhesiveness was at an allowable level.

D: The ratio of the increase in adhesiveness was more than 2.0, and the low increase in adhesiveness was poor.

(3) Expandability

Each of the adhesive films in Examples and Comparative Examples was attached to a polypropylene film using a table laminator in an environment of a room temperature of 23° C. and a relative humidity of 50% under conditions of a pressure of 5.9×10$^5$ Pa and a speed of 30 m/min. Thereafter, each produced film was allowed to stand at 60° C. for 60 minutes, and then the 180-degree peel strength of each film (25 mm width) was measured at a rate of 15 m/min in accordance with the method of JIS Z0237, and the strength of each film was defined as an expanding force. From the obtained expanding force, the expandability was determined based on the following four determination criteria from A to D.

A: less than 0.05 N/10 mm, and the expandability was extremely good.

B: 0.05 N/10 mm or more and less than 0.10 N/10 mm, and the expandability was good.

C: 0.10 N/10 mm or more and less than 0.20 N/10 mm, and the expandability was an allowable level.

D: 0.20 N/10 mm or more, and there was concern about adverse effects on rewinding from a film roll, and the expandability was poor.

(4) Adhesive Residue

In the evaluation of the low increase in adhesiveness of (3), the surface of the SUS plate after the evaluation of the peel strength over time was visually observed, and presence or absence of residue of the adhesive layer was confirmed. Based on the presence or absence of the residue, the adhesive residue was determined according to the following two determination criteria of A and B.

A: There was no residue, and the adhesive residue was good.

B: The residue was observed, a contamination property to a polar adherend was high, and the adhesive residue was poor.

(5) Oil Resistance

Each adhesive film was left to stand at room temperature (23° C.) for 1 day in a state where the adhesive film was immersed in oleic acid, and then the adhesive film was taken out and an appearance was confirmed. From the appearance, the oil resistance was determined according to the following three determination criteria from A to C.

A: There is no change in the appearance of the adhesive layer, and the oil resistance is good.

B: Wrinkles were observed on the surface of the adhesive layer, and the oil resistance was at an allowable level.

C: A part of the adhesive layer is dissolved, oil adhesion may adversely affect the adhesiveness, and the oil resistance is poor.

TABLE 1

| | | | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Example 4 |
|---|---|---|---|---|---|---|---|---|---|---|---|---|---|---|---|
| Polymer | Polymer name | | A-1 | A-2 | A-3 | A-4 | A-5 | A-6 | A-7 | A-8 | A-9 | A-10 | A-11 | A-12 | A-13 |
| | Block A | Monomer | BD | BD | BD | BD | BD | BD | BD | BD | BD | BD | BD | ST | ST |
| | | Number of parts (parts by mass) | 30 | 30 | 30 | 30 | 30 | 30 | 30 | 30 | 30 | 30 | 30 | 30 | 30 |
| | | Vinyl bond content (mol %) | 15 | 15 | 15 | 15 | 15 | 15 | 15 | 15 | 15 | 15 | 15 | — | — |
| | Block B | Monomer | BD | BD | BD | BD/ST | BD | BD | BD | BD | BD | BD | BD | BD | BD |
| | | Number of parts (parts by mass) | 70 | 70 | 70 | 50/20 | 70 | 70 | 70 | 70 | 70 | 70 | 70 | 70 | 70 |
| | | Vinyl bond content (mol %) | 75 | 75 | 75 | 75 | 75 | 75 | 75 | 75 | 45 | 75 | 75 | 75 | 75 |
| | Initiation terminal modifying agent | | R-1 | R-1 | R-1 | R-1 | R-2 | R-1 | R-2 | R-1 | R-1 | None | R-1 | None | None |
| | Coupling agent | | C-1 | C-1 | C-2 | C-1 | C-1 | C-3 | C-1 | C-1 | C-1 | C-1 | C-1 | C-2 | C-2 |
| | 1st peak molecular weight (×10$^4$) | | 10 | 10 | 18 | 10 | 10 | 10 | 10 | 10 | 10 | 10 | 10 | 18 | 18 |
| | Total molecular weight (×10$^4$) | | 30 | 30 | 30 | 30 | 30 | 30 | 30 | 20 | 30 | 30 | 30 | 30 | 30 |

TABLE 1-continued

|  |  | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Example 4 |
|---|---|---|---|---|---|---|---|---|---|---|---|---|---|---|
|  | Coupling rate | 75 | 75 | 75 | 75 | 75 | 75 | 75 | 40 | 75 | 75 | 75 | 75 | 75 |
|  | Hydrogenation rate (%) | 98 | 90 | 98 | 98 | 98 | 98 | 98 | 98 | 98 | 98 | 60 | 98 | 98 |
|  | Post-modification | No | No | No | No | No | No | D-1 | No | No | No | No | No | D-1 |
| Evaluation result | Peel strength | B | A | C | B | A | A | A | A | C | D | A | D | B |
|  | Low increase in adhesiveness | A | B | C | A | B | A | A | C | A | B | D | B | C |
|  | Expandability | B | C | B | A | C | A | A | C | A | C | D | B | C |
|  | Adhesive residue | A | A | A | A | A | A | A | A | A | A | A | A | B |
|  | Oil resistance | A | B | A | A | A | A | A | B | A | A | C | C | C |

In Table 1, abbreviations of a monomer, an initiation terminal modifying agent, a coupling agent, and a post-modifying agent represent the following compounds.
BD: 1,3-butadiene
ST: styrene
R-1: piperidine
R-2: N-(tert-butyldimethylsilyl) piperazine
C-1: tetrachlorosilane
C-2: methyldichlorosilane
C-3: 1,1'-(1,4-phenylene)bis(N-(3-(triethoxysilyl)propyl)methaneimine)
D-1: maleic anhydride As shown in the above results, in Examples 1 to 9, all of the peel strength, the low increase in adhesiveness, the expandability, the adhesive residue suppression, and the oil resistance were good, and various properties were balanced. In particular, in Example 6 in which the terminal modifying agent was used as the coupling agent, and in Example 7 in which the post-modification was performed, all the evaluations were the evaluation A. These Examples were particularly excellent. In contrast, Comparative Examples 1 to 4 were inferior in at least one of the evaluations, and were inferior to Examples 1 to 9.

From the above results, it has been revealed that the block polymer of the present disclosure is excellent in initial adhesiveness, low increase in adhesiveness, expandability, and oil resistance, and hardly causes adhesive residue on an adherend.

The invention claimed is:

1. A block polymer comprising:
   two or more polymer block As each having a value β of 0.20 or less represented by the following equation (ii); and
   a functional group F comprising at least one element selected from a group consisting of nitrogen, silicon, oxygen, and sulfur in a part or all of the initiating terminals of the two or more polymer block As,
   wherein the block polymer has a value α of 0.75 or more represented by the following equation (i), where p is defined as a component proportion (molar proportion) of a structural unit represented by the following formula (1), q is defined as a component proportion (molar proportion) of a structural unit represented by the following formula (2), r is defined as a component proportion (molar proportion) of a structural unit represented by the following formula (3), and s is defined as a component proportion (molar proportion) of a structural unit represented by the following formula (4), in the polymer $$\alpha = (p + (0.5 * r))/(p + q + (0.5 * r) + s) \quad (i)$$

$$\beta = (p + q)/(p + q + (0.5 * r) + s) \quad (ii)$$

$$-CH_2-\underset{|}{C}H- \atop CH_2-CH_3 \quad (1)$$

$$-CH_2-\underset{|}{C}H- \atop CH=CH_2 \quad (2)$$

$$-CH_2-CH_2- \quad (3)$$

$$-CH_2-CH=CH-CH_2-. \quad (4)$$

2. The block polymer according to claim 1,
   wherein the block polymer has a structure in which two or more polymer chains having the polymer block A bond to a partial structure E derived from a coupling agent.

3. The block polymer according to claim 2,
   wherein the block polymer has a structure in which four or more polymer chains having the polymer block A bond to the partial structure E.

4. The block polymer according to claim 2,
   wherein the polymer block A is arranged at an end of the block polymer, and
   the block polymer has the functional group F at a terminal of the block polymer.

5. The block polymer according to claim 2,
   wherein the coupling agent has a functional group containing nitrogen.

6. The block polymer according to claim 1,
   wherein the functional group F comprises at least one selected from a group consisting of a primary amino group, a secondary amino group, a tertiary amino group, and an imide group.

7. The block polymer according to claim 1,
   wherein the block polymer is modified with maleic anhydride.

8. The block polymer according to claim 1, further comprising:
a polymer block B having the value β of 0.25 or more.

9. The block polymer according to claim 8,
wherein the polymer block B has a structural unit derived from a conjugated diene compound and a structural unit derived from an aromatic vinyl compound.

10. A polymer mixture comprising:
the block polymer according to claim 1; and
a block polymer having one polymer block A and having the value α of 0.75 or more.

11. An adhesive, which is obtained using the block polymer according to claim 1.

12. The block polymer according to claim 3,
wherein the polymer block A is arranged at an end of the block polymer, and
the block polymer has the functional group F at a terminal of the block polymer.

13. The block polymer according to claim 3,
wherein the coupling agent has a functional group containing nitrogen.

14. The block polymer according to claim 4,
wherein the coupling agent has a functional group containing nitrogen.

15. The block polymer according to claim 12,
wherein the coupling agent has a functional group containing nitrogen.

16. The block polymer according to claim 2,
wherein the functional group F comprises at least one selected from a group consisting of a primary amino group, a secondary amino group, a tertiary amino group, and an imide group.

17. The block polymer according to claim 3,
wherein the functional group F comprises at least one selected from a group consisting of a primary amino group, a secondary amino group, a tertiary amino group, and an imide group.

18. The block polymer according to claim 4,
wherein the functional group F comprises at least one selected from a group consisting of a primary amino group, a secondary amino group, a tertiary amino group, and an imide group.

19. The block polymer according to claim 5,
wherein the functional group F comprises at least one selected from a group consisting of a primary amino group, a secondary amino group, a tertiary amino group, and an imide group.

20. The block polymer according to claim 12,
wherein the functional group F comprises at least one selected from a group consisting of a primary amino group, a secondary amino group, a tertiary amino group, and an imide group.

* * * * *